United States Patent [19]

Dugan

[11] Patent Number: 4,860,520
[45] Date of Patent: Aug. 29, 1989

[54] SYSTEM FOR CONTROLLING THE MOVEMENT OF FILLED AND SEALED CONTAINERS

[75] Inventor: Larry M. Dugan, Boulder, Colo.

[73] Assignee: Adolph Coors Company, Golden, Colo.

[21] Appl. No.: 217,377

[22] Filed: Jul. 11, 1988

Related U.S. Application Data

[63] Continuation of Ser. No. 33,335, Mar. 31, 1987, abandoned.

[51] Int. Cl.$^4$ .............................................. B65B 7/28
[52] U.S. Cl. ..................................... 53/287; 198/440
[58] Field of Search ............... 198/436, 440, 458, 462, 198/442; 53/287

[56] References Cited

U.S. PATENT DOCUMENTS

| | | | |
|---|---|---|---|
| 2,500,465 | 3/1950 | Meyer | 198/579 X |
| 3,150,760 | 9/1964 | Nigrelli et al. | 198/440 |
| 3,165,193 | 1/1965 | Stevenson, Jr. | 198/440 X |
| 3,552,537 | 1/1971 | Vamvakas | 198/442 |
| 3,635,322 | 1/1972 | Raudat et al. | 198/440 |
| 3,771,648 | 11/1973 | Revuelta | 198/440 X |
| 3,791,518 | 2/1974 | Vanderhoof | 198/440 X |
| 4,320,840 | 3/1982 | Braschos | 198/440 X |
| 4,501,365 | 2/1985 | Peyton et al. | 198/440 X |

Primary Examiner—Robert J. Spar
Assistant Examiner—D. Glenn Dayoan
Attorney, Agent, or Firm—Klaas & Law

[57] ABSTRACT

A system for controlling the movement of filled and sealed beverage containers so that they will move from a filling and sealing apparatus to a liquid level testing apparatus in a set period of elapsed time which is maintained substantially constant and wherein all of the filled and sealed containers are first deposited on a first half width portion of a moving endless conveyor and after that every other filled and sealed container is pushed to a second half width portion of the moving endless conveyor. The filled and sealed containers are then transferred to a first or second moving fill test conveyor moving at a linear velocity less than the linear velocity of the moving endless conveyor and which functions to feed the filled and sealed containers to a first or second liquid level testing apparatus and wherein the linear velocity of the first and second moving fill test conveyors controls the period of elapsed time.

20 Claims, 6 Drawing Sheets

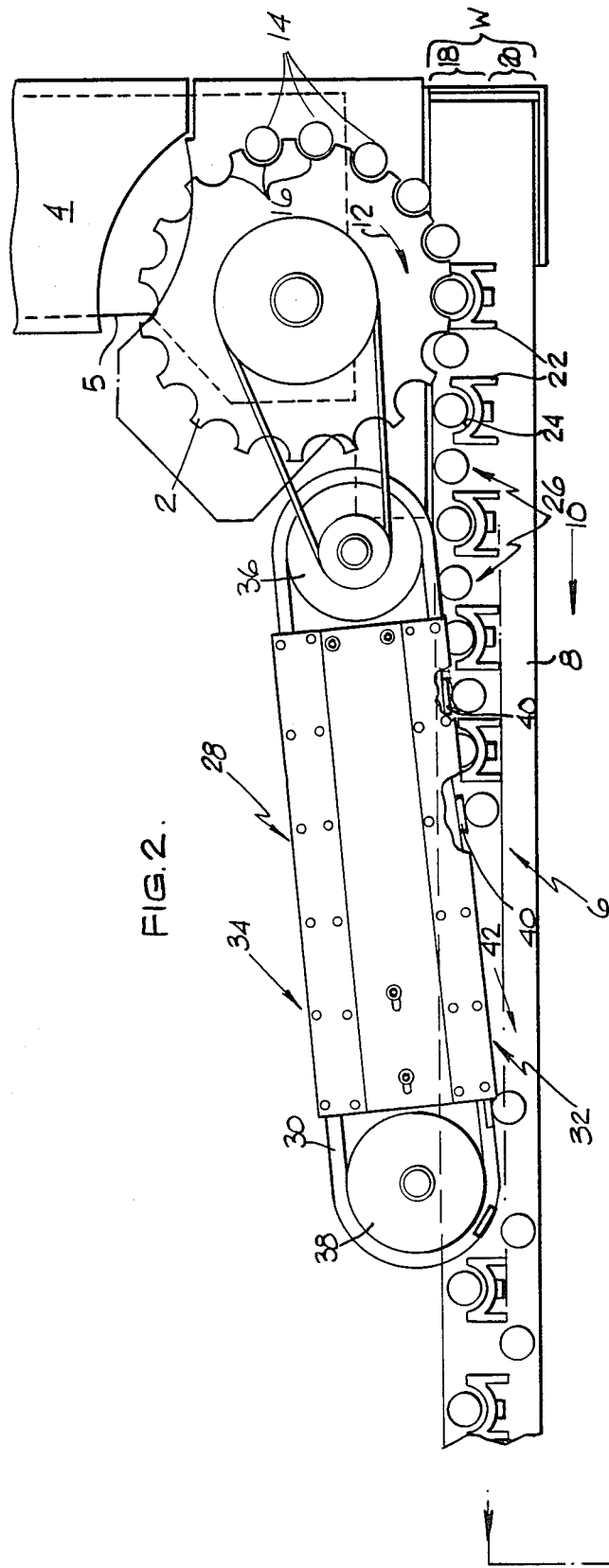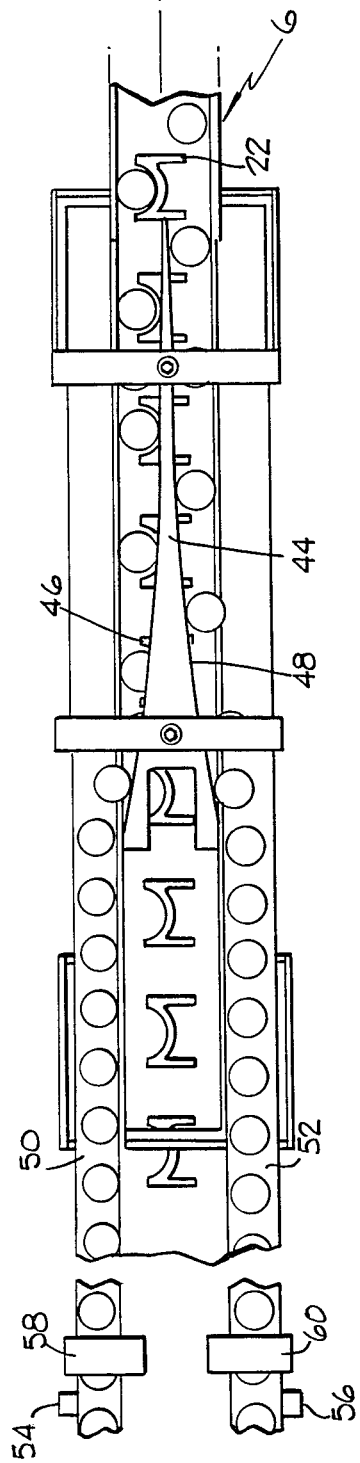
FIG. 2.

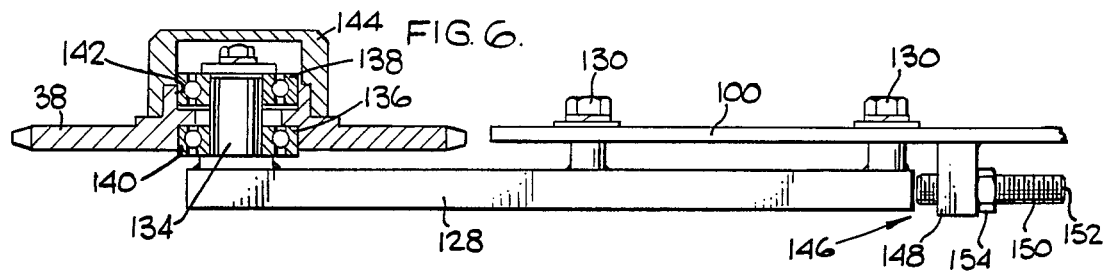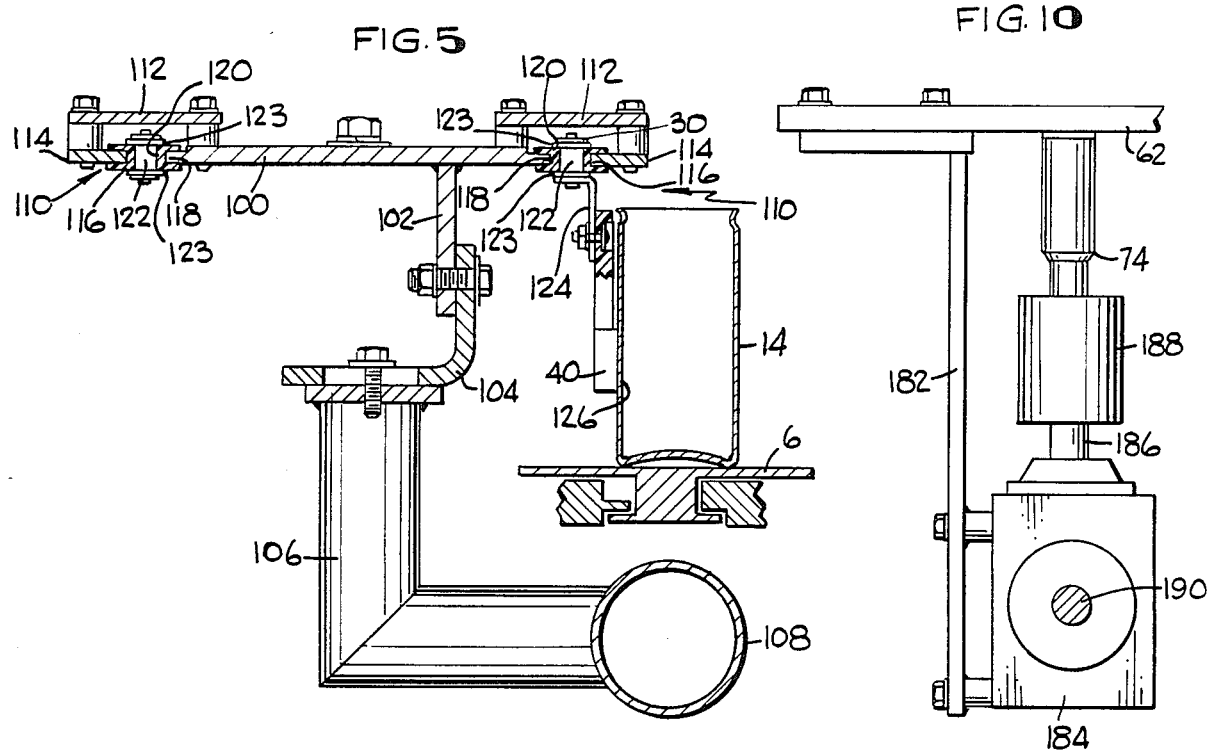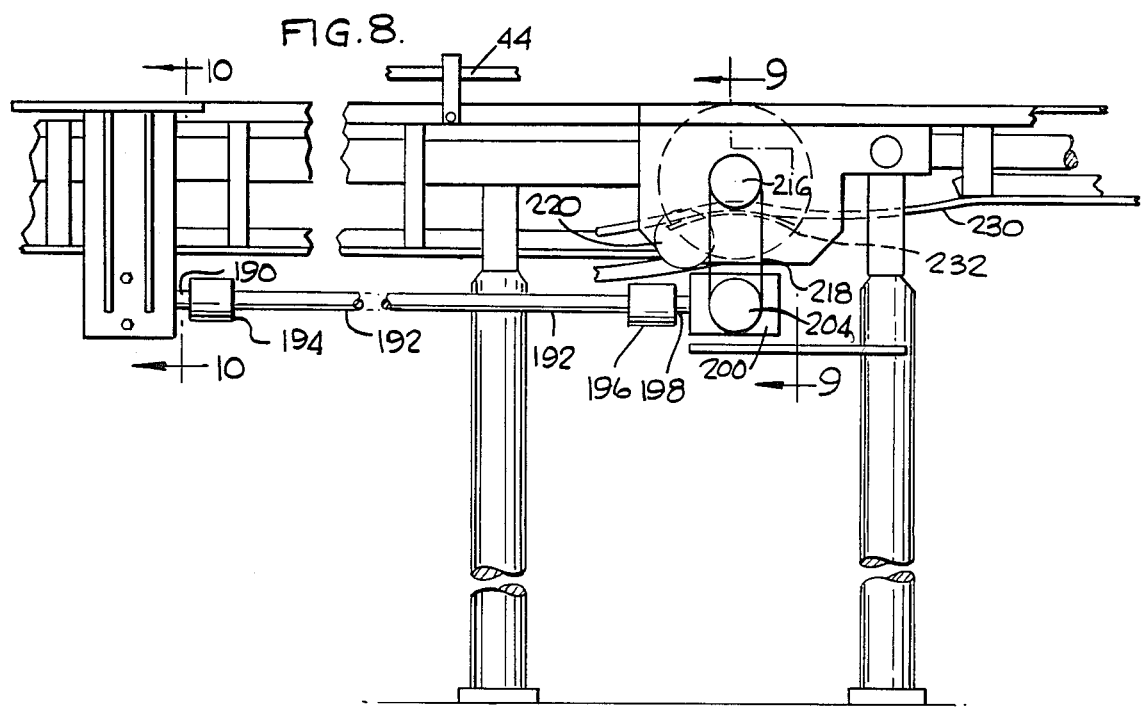

SYSTEM FOR CONTROLLING THE MOVEMENT OF FILLED AND SEALED CONTAINERS

This application is a continuation of application Ser. No. 033,335, filed Mar. 31, 1987, now abandoned.

FIELD OF THE INVENTION

This invention relates generally to a system for controlling the movement of filled and sealed containers, such as beer cans, and more specifically to a system for controlling the movement of filled and sealed containers between a container sealing apparatus and a liquid level testing apparatus.

BACKGROUND OF THE INVENTION

Many beverages, such as beer, are marketed in containers, such as cans, wherein automatic machinery is used to fill the cans and then seam such filled cans with lids which are attached to a filled can body in an automatic seamer or apparatus. To ensure that each can has been filled with the proper amount of beverage, each can is passed through a liquid level testing apparatus. This is important since a level of liquid in each can below a desired amount could lead to consumer complaints while a level of liquid in each can above a desired amount is undesirable as a manufacturing cost. Also, state laws regulate the level for each can above and below a standard. When the beverage in the filled and seamed can is carbonated, such as beer, the automatic filling and seaming operations produce foam in the filled and seamed cans which present difficulties at the liquid level testing apparatus. It is possible to calculate the time period for at least a substantial portion of the foam to revert back into the liquid so that the standard level for the liquid in the container can be determined. Therefore, the liquid level testing apparatus may be adjusted to test at such a standard level if the elapsed time for the movement of a filled and seamed can between the filling and seaming apparatus and the liquid level testing apparatus can be controlled. If the filled and seamed cans could be passed directly to a liquid level testing apparatus, the time could easily be controlled using appropriate conveyor speeds. However, the conventional automatic filling and seaming apparatus produce filled and seamed cans at rates significantly higher than can be handled by one liquid level testing apparatus. Therefore, it has become an accepted practice to use two liquid level testing apparatuses for each automatic can filling and seaming system. The use of two liquid level testing apparatuses present a problem in controlling the elapsed time of a filled and seamed can as it is moved between the seaming apparatus and the liquid level testing apparatus.

BRIEF DESCRIPTION OF THE INVENTION

This invention provides a system for controlling the movement of each container between a container sealing apparatus and a liquid level testing apparatus so that each filled and sealed container arrives at and is tested by the liquid level testing apparatus at a desired time interval after it leaves the sealing apparatus.

In a preferred embodiment of the invention, a moving endless conveyor means is mounted to receive filled and seamed cans from a rotating star wheel means of a conventional seaming apparatus. The moving endless conveyor means has a width which is slightly greater than twice the diameter of each can so as to have a first half width portion and a second half width portion. The moving endless conveyor means is moved at a linear velocity that is substantially the same as the peripheral velocity of the star wheel means so that filled and seamed cans may be readily transferred from the star wheel means to the moving endless conveyor means. The moving endless conveyor means are located relative to the star wheel means so that each filled and seamed can transferred thereto is deposited on the first half width portion thereof. Can pushing means are provided for contacting every other filled and seamed can on the first half width portion and pushing such every other filled and seamed can from the first half width portion to the second half width portion. Can transfer means are provided for transferring filled and seamed cans on the first half width portion to a first moving fill test conveyor means leading to a first liquid level testing apparatus and for transferring the filled and seamed cans on the second half width portion to a second moving fill test conveyor means leading to a second liquid level testing apparatus. The first and second moving fill test conveyor means have linear velocities which are dependent upon the desired time interval between the seamed can transfer to the endless conveyor means and the liquid level testing apparatus. Since the distance that each filled and seamed can is on the first and second moving fill test conveyor means is known, it is possible to maintain the elapsed time of each filled and seamed can as it moves from its deposition on the first or second fill test conveyor means to a liquid level testing apparatus substantially constant at a desired time interval. The desired time interval is primarily controlled by the length and the velocity of the first and second moving fill test conveyor means. Although the invention is described specifically in relation to filled and seamed cans, it can also be used with bottles and sealed caps or other types of containers.

BRIEF DESCRIPTION OF THE DRAWINGS

An illustrative and presently preferred embodiment of the invention is shown in the accompanying drawings in which:

FIG. 2 is a top plan view illustrating the system of this invention;

FIG. 5 is a cross-sectional view taken on the line 5—5 of FIG. 3;

FIG. 6 is a cross-sectional view taken on the line 6—6 of FIG. 3;

FIG. 8 is a side elevational view of a portion of the can transfer means;

FIG. 10 is a side elevational view of a portion of the endless conveyor driving means.

DETAILED DESCRIPTION OF THE INVENTION

Figure 1:
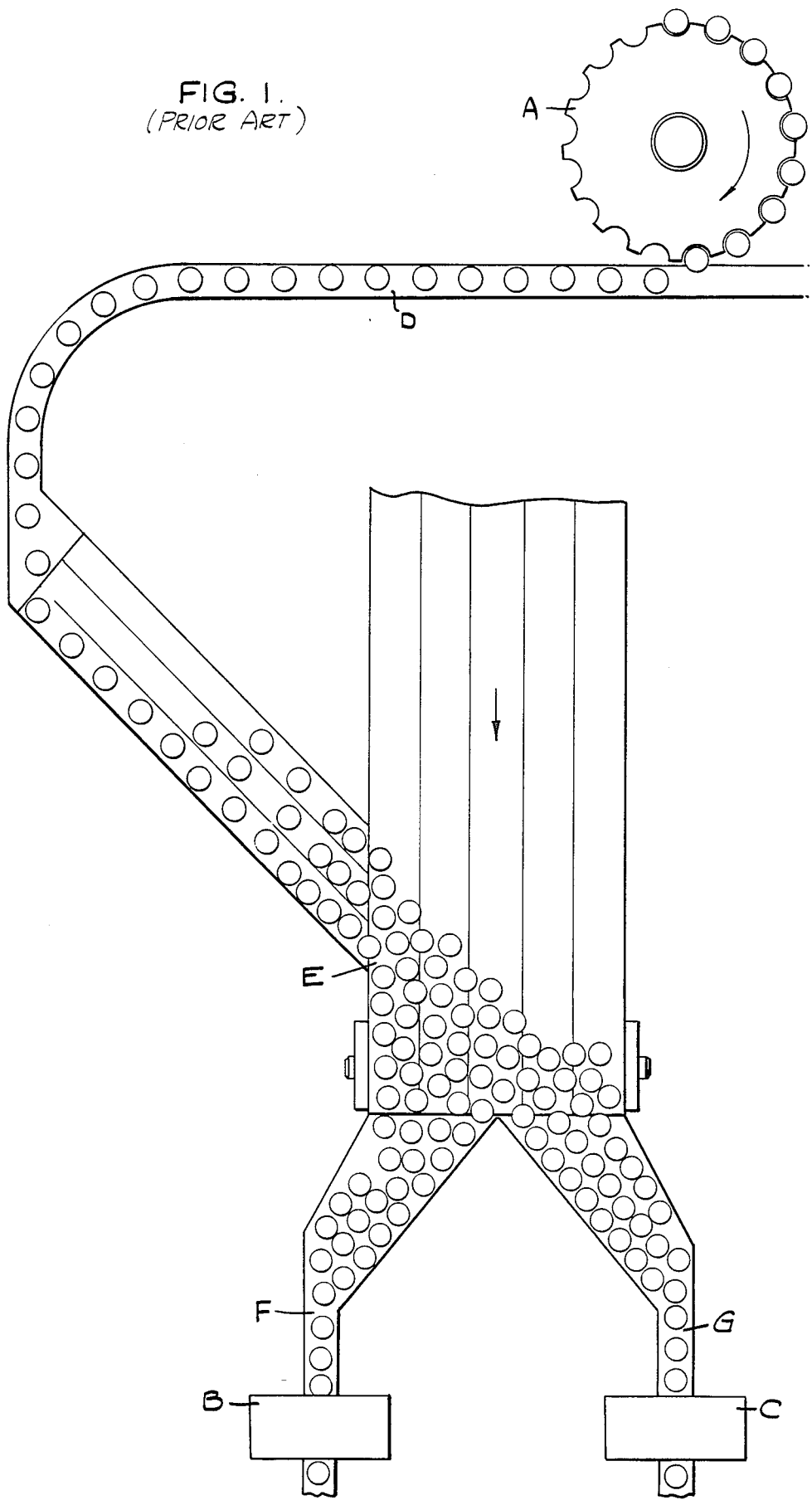
FIG. 1 is a schematic illustration of a prior art system for transferring filled and seamed cans from a can seamer apparatus to two liquid level testing apparatuses.

In FIG. 1, there is a schematic illustration of a prior art system for transferring filled and seamed cans from a can seamer star wheel A to two liquid level testing apparatuses B and C. The filled and seamed cans move from the star wheel means A to a moving conveyor D, are transferred to an accumulator table E and then gradually moved to two fill test conveyors F and G. This system provides no precise control of the movement of each filled and seamed can from the star wheel means A to either of the liquid level testing apparatuses B or C.

The apparatus and system of this invention is illustrated generally in FIG. 2 and comprises a rotatable star wheel means 2 forming a part of a filled can seamer apparatus 4 having conventional driving means 5 for rotating the rotatable star wheel means 2. An endless conveyor means 6 is fixedly mounted near the seamer apparatus 4 and has an upper reach 8 which is driven in the direction indicated by the arrow 10. The star wheel means 2 is rotated in the direction indicated by the arrow 12 and has a peripheral velocity substantially equal to the linear velocity of the endless conveyor means 6 so that filled and seamed cans 14 in the star wheel pockets 16 may be readily transferred from the star wheel means 2 onto the moving endless conveyor means 6 so as to be supported thereon and to move therewith. The endless conveyor means 6 has a width W which is slightly greater than twice the diameter of each of the filled and seamed cans 14 and has a first half width portion 18 and a second half width portion 20 for a purpose to be described below. All of the filled and seamed cans 14 transferred by the star wheel means 2 onto the moving endless conveyor means 6 are located on the first half width portion 18.

In a preferred embodiment of the invention, a plurality of spaced apart can pocket means 22 are fixedly mounted on the endless conveyor means 6 and have arcuately shaped surfaces 24 for receiving a filled and seamed can 14. The space 26 between two adjacent can pocket means 22 is slightly greater than the diameter of a filled and seamed can 14 so that a filled and seamed can 14 may be transferred therein by the star wheel means 2. The longitudinal axis of a filled and seamed can 14 in the space 26 is half-way between the longitudinal axes of the filled and seamed cans 14 in adjacent can pocket means 22 on either side thereof.

In accordance with the invention, can pushing means 28 are provided for pushing every other filled and seamed can 14 from the first half width portion 18 to the second half width portion 20. As illustrated generally in FIG. 2 and described more fully below, the can pushing means 28 comprises a conventional moving endless chain means 30 moving in spaced apart fixed paths 32 and 34 extending between a driven sprocket means 36 and an idler sprocket means 38. A plurality of spaced apart can pusher means 40 are fixedly secured to the endless chain 30 and are spaced apart a distance so that the can pusher means 40 will contact every other can 14 on the first half width portion 18. In the illustration of FIG. 2, every other can 14 is located in a space 26. As illustrated in FIG. 2, the fixed path 32 extends diagonally across the moving endless conveyor 6 and the endless chain means 30 moves in the direction indicated by the arrow 42. As described below, the moving endless conveyor means 6 and the endless chain means 30 move at substantially the same linear velocity so that the can pusher means 40 gradually moves every other can 14 from the first half width portion 18 to the second half width portion 20.

A can transfer means 44 is mounted slightly above the top of the can pocket means 22 and has a longitudinal axis which is spaced above and parallel to the longitudinal axis of the endless conveyor means 6. The can transfer means 44 has a first inclined surface 46 so that the seamed and filled cans 14 on the first half width portion 18 will be moved into contact therewith by the moving endless conveyor means 6. The can transfer means 44 has a second inclined surface 48 so that the seamed and filled cans 14 on the second half width portion 20 will be moved into contact therewith by the moving endless conveyor means 6. The filled and seamed cans 14 on the first half width portion 18 are gradually moved by the first inclined surface 46 onto a first moving fill test conveyor means 50 and the filled and seamed cans 14 on the second half width portion 20 are gradually moved by the second inclined surface 48 onto a second moving fill test conveyor means 52. The first and second moving fill test conveyor means 50 and 52 are driven by conventional driving means 54 and 56 so that each of them moves at substantially the same linear velocity but which linear velocity is substantially less than the linear velocity of the moving endless conveyor means 6. The filled and seamed cans 14 on the first moving fill test conveyor means 50 pass through a first liquid level testing apparatus 58 and the filled and seamed cans on the moving second fill test conveyor means 52 pass through a second liquid level testing apparatus 60. As explained below, the linear velocity of the first and second moving fill test conveyor means 50 and 52 is the primary control on the elapsed time of each filled and seamed can 14 from the time it is deposited on the moving endless conveyor means 6 until the time it is passed through the first or second liquid level testing apparatus 58 or 60.

The can pusher means 28 is illustrated in FIGS. 3-6 and comprises a base plate 62 which is mounted on a fixed support 64 of the can seamer apparatus 4. The drive means for the endless chain means 30 comprises a sprocket 66 fixed to the star wheel means 2 for rotation therewith and a sprocket 68 rotatably mounted by support means on the base plate 62. A conventional drive chain 70 is mounted for movement around the sprockets 66 and 68. A conventional chain tensioning means 72 is used to ensure the proper tension in the drive chain 70. The sprocket 68 is press fitted to a rotatable shaft 74 in a conventional manner and is mounted in the bearings 76 and 78 mounted on the support means 80 which is fixedly mounted on the base plate 62. An end cap 82 is mounted on one end of the support means 80 and sealing means 84 are located between the end cap 82 and the support means 80. Conventional sealing means 86 are provided to protect the lower bearing 78.

The mounting means for the endless chain means 30 is illustrated in FIG. 5 and comprises a plate member 100 having a depending support flange 102 which is mounted on a support angle member 104 which is adjustably mounted on a pipe bracket support 106 which extends out of a fixed support means 108. Guide means 110 are provided on each side of the plate member 100 and comprise an elongated member 112 mounted a short distance above the plate member 100. An elongated guide bar 114 is mounted on each of the elongated members 112 and has an edge 116 which is spaced from and opposite to an edge 118 of the plate member 100. A U-shaped plastic wear strip 120 is mounted on each of the edges 116 and 118 and forms opposed surfaces for receiving the rollers 122 of the endless chain means 30. Conventional end means 123 on the rollers 122 maintain the rollers 122 between the wear strips 120. Each can pusher means 40 is mounted on a bracket 124 depending from and fixedly secured to the endless chain means 30 and has a generally planar surface 126 for contacting the outer surface of the filled and seamed can 14.

Figure 3:
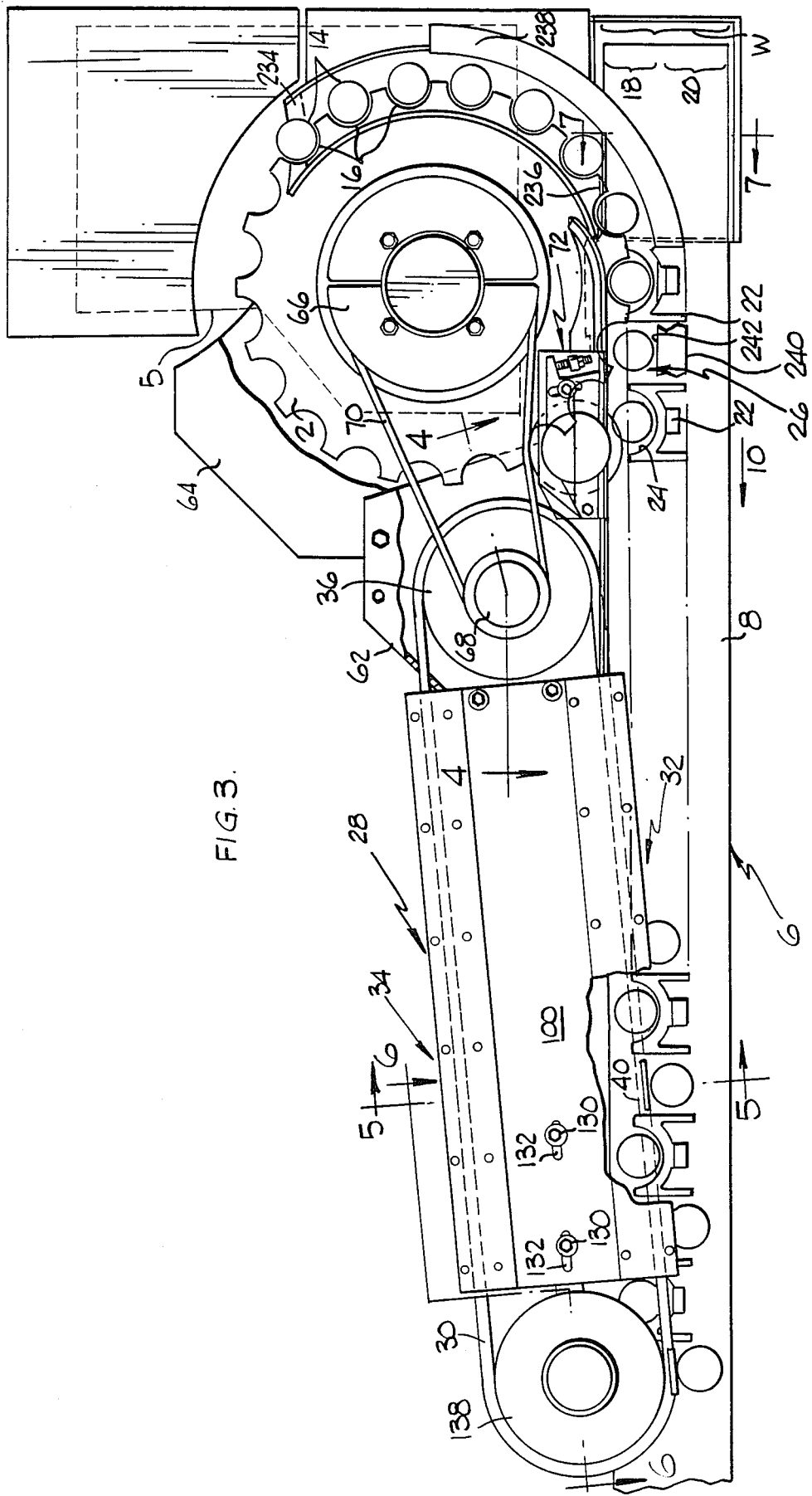
FIG. 3 is a top plan view of the can pushing means of FIG. 2.
Figure 4:
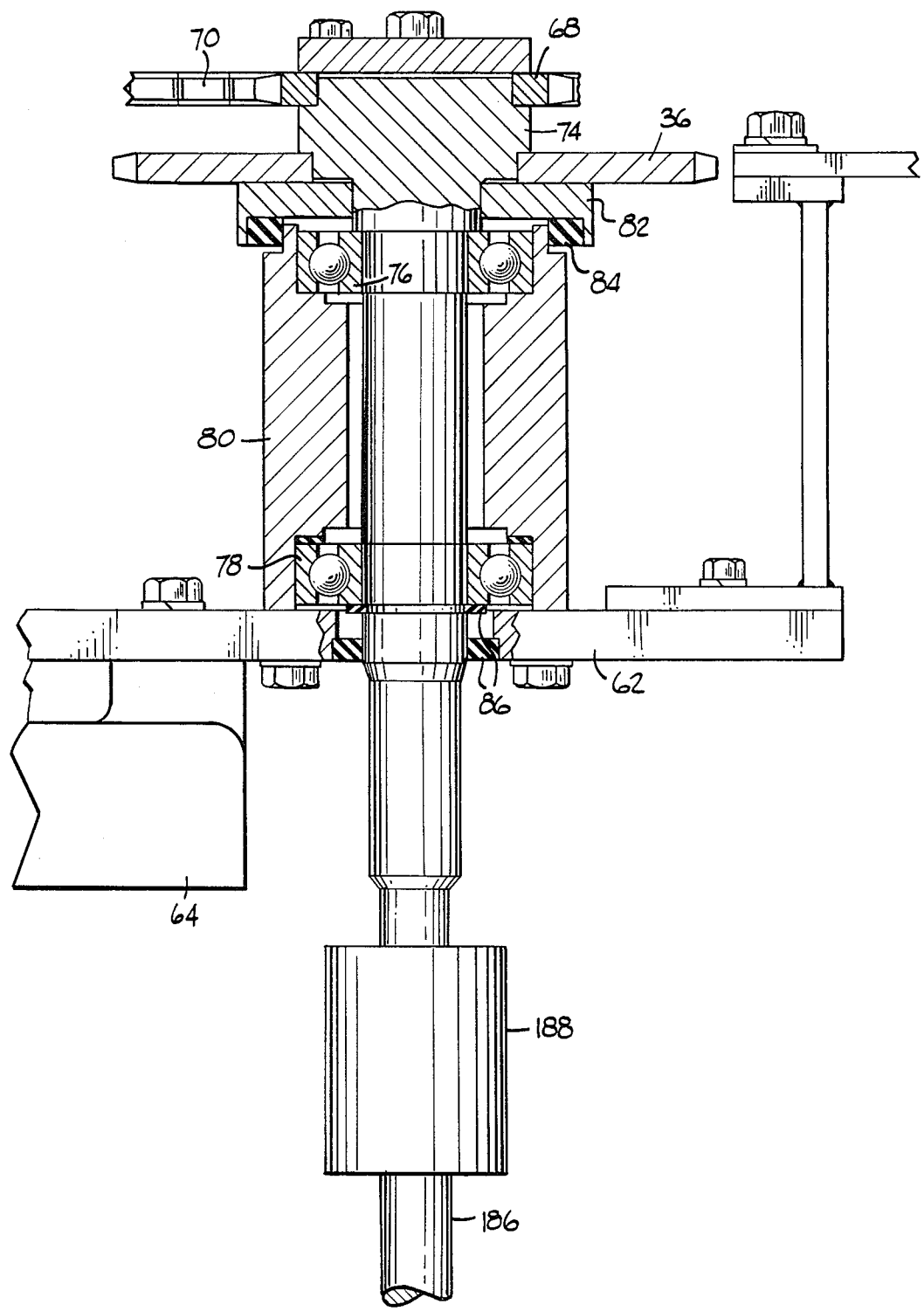
FIG. 4 is a cross-sectional view taken on the line 4—4 of FIG. 3.

In FIGS. 3 and 6, there is illustrated the mounting and tensioning means for the idler sprocket means 38. An elongated support member 128 is mounted by threaded bolts 130 for slidable movement in slots 132 in the plate member 100. A stationary shaft 134 is mounted at one end of the elongated support member 128 and projects upwardly therefrom. Two spaced apart bearings 136 and 138 are press fitted in a conventional manner on the stationary shaft 134 and to inner surfaces 140 and 142 of the idler sprocket means 38 so as to rotatably support the idler sprocket means 38. A cap member 144 protects the bearings 136 and 138 from deleterious materials. At the other end of the elongated support member 128, there is provided tensioning means 146 for the endless chain means 30 comprising a depending lug 148 mounted on the under surface of the plate member 100. A threaded bolt 150 is threaded in a threaded opening in the depending lug 148. The threaded bolt 150 is provided with suitable means 152, such as an allen head socket, so that it may be rotated to bear against and move the elongated support member 128. A threaded nut 154 is used to hold the threaded bolt 150 in the adjusted position so that a proper tension is maintained on the endless chain means 30.

Figure 7:
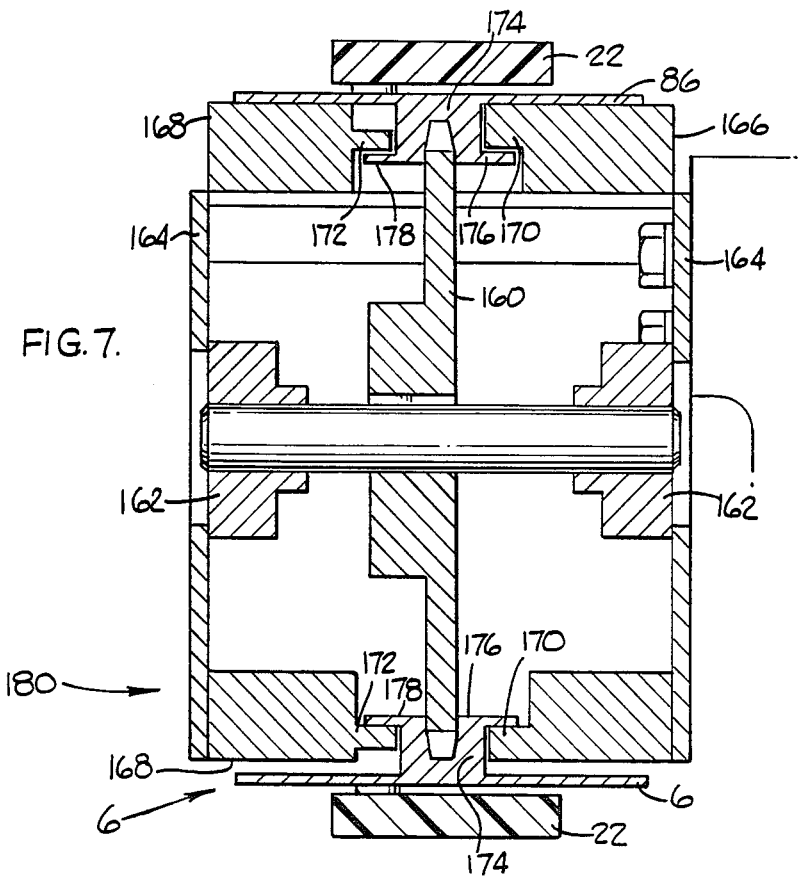
FIG. 7 is a cross-sectional view taken on the line 7—7 of FIG. 3.

The endless conveyor means 6, except for the can pockets 22, is of conventional design. In FIG. 7, there is illustrated the return sprocket means 160 which is rotatably mounted in bearing blocks 162 secured to the housing 164. Upper guide means 166 and 168 are supported in a fixed position and have guide flanges 170 and 172 integral therewith. The endless conveyor means 6 has a projection 174 extending between the guide flanges 170 and 172 and a pair of flanges 176 and 178 projecting outwardly in opposite directions from the projection 174 so that the guide flanges 170 and 172 are received therein. The lower guide means 180 is of similar structure as the upper guide means and has been identified with corresponding reference numerals.

The drive means for the moving endless conveyor means 6 is illustrated in FIGS. 4 and 8-10. A support plate 182, FIG. 10, is fixedly mounted on the base plate 62 and is used to support a conventional gear reducer 184. A rotatable shaft 186 extends out of the gear reducer 184 and is coupled for rotation with the shaft 74 by a conventional jaw type coupling 188. Another rotatable shaft 190 extends out of the gear reducer 184 and is coupled for rotation with a rotatable shaft 192 through a jaw type coupling 194. The rotatable shaft 192 is coupled by a jaw type coupling 196 to a rotatable shaft 198 extending out of a gear reducer 200. A rotatable shaft 202 extends outwardly from and is rotated by conventional means in the gear reducer 200. A sprocket 204 is secured to the rotatable shaft 202 for rotation therewith. A rotatable shaft 206 is mounted conventionally in bearing blocks 208 and 210 fixedly mounted in support means 212 and 214. A sprocket 216 is secured to the rotatable shaft 206 so that rotation of the sprocket 216 rotates the rotatable shaft 206. A drive chain 218 extends around and is coupled to the sprockets 204 and 216 so that rotation of the rotatable shaft 202 rotates sprocket 216 and rotatable shaft 206. Conventional means 220 are used to apply a proper tension on the drive chain 218. A sprocket 222 is fixedly mounted on the rotatable shaft 206 for rotation therewith and conventional driving means 224 translate rotational movement of the sprocket 222 into linear movement for the moving endless conveyor means 6.

Figure 9:
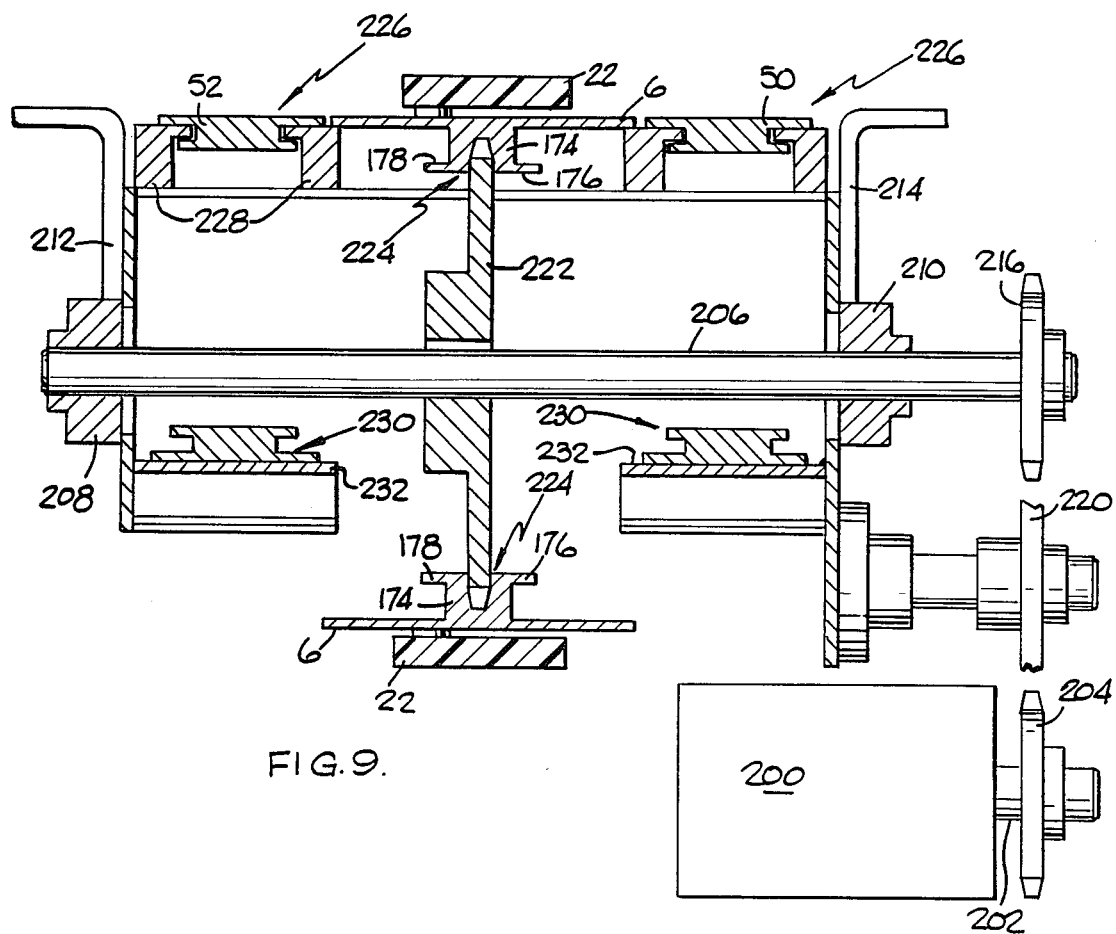
FIG. 9 is a cross-sectional view taken on the line 9—9 of FIG. 8.

The first and second fill test conveyor means 50 and 52 are of conventional design and are illustrated in FIGS. 8 and 9. The upper reach 226 of each is mounted for guided movement on similar guide means 228. The lower reach 230 is non-tensioned and passes over arcuately shaped guide means 232.

In operation, the star wheel means 2 receives filled and seamed cans 14 from the can seamer apparatus 4 and moves them over a support surface means 234 which terminates at an end portion 236 next adjacent to the first half width portion 18 so that filled and seamed cans 14 may be readily transferred to the first half width portion 18. A guide means 238 is mounted a distance spaced above the support surface means 234 and has an end portion 240 having an inner edge 242 located to ensure that the filled and seamed cans 14 are properly positioned on the first half width portion 18. The filled and seamed cans 14 move with the moving endless conveyor means 6 until every other can 14 is contacted by a can pusher means 40 and moved from the first half width portion 18 to the second half width portion 20. The filled and seamed cans 14 move with the endless conveyor means 6 until they contact either the inclined surface 46 or 48 and are transferred either to the first or second moving fill test conveyor means 50 or 52 and are passed through the first or second liquid level testing apparatus 58 or 60.

As stated above, the primary concern is to ensure that each filled and seamed can moves from its deposition on the moving endless conveyor means to the liquid level testing apparatus in a desired elapsed time period which is maintained substantially constant. Therefore, the first criteria to be established is the optimum elapsed time period at which the liquid level should be tested. This will vary depending on the beverage involved, the size of the can and other considerations. In one embodiment of the invention, the beverage is beer of a certain standard and the size of the can is twelve fluid ounces and the optimum elapsed time period is twenty-one seconds.

A can seaming apparatus 4 is normally run to produce filled and seamed cans at the rate of between about 1,400 and 2,000 cans per minute. This means that the peripheral velocity of the star wheel means 2 and the linear velocity of the moving endless conveyor means 6 is between about 437 and 625 feet per minute. The distance between the location where the filled and seamed cans are deposited on the first half width portion 18 by the star wheel means 2 and the location where the filled and seamed cans 14 are transferred to the first or second fill test conveyor means 50 or 52 is relatively short. Since any difference in time between production at 1,400 or 2,000 cans per minute would be minimal, the time that the filled and seamed cans 14 spend on the moving endless conveyor means 6 is not considered in determining the preferred elapsed time from the deposition of the filled and seamed can 14 on the moving endless conveyor means 6 until it passes through either the liquid level testing apparatus 58 or 60. Therefore, the optimum elapsed time will be the time between the transfer of a filled and seamed can 14 to either moving fill test conveyor means 50 and 52 until its passage through either liquid level testing apparatus 58 or 60. Since the distance between the location at which a filled and seamed can 14 is transferred to either moving fill test conveyor means 50 or 52 and the associated liquid level testing apparatus 58 or 60 remains constant, the optimum elapsed time period is obtained by controlling the velocity of the moving fill test conveyor means 50 and 52. In the foregoing example, the optimum elapsed time was calculated to be twenty-one seconds so that each fill test conveyor means 50 and 52 for the distance involved was run at a linear velocity of about 315 feet per minute. If the optimum time period was greater, the linear velocity would be slower.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A system for controlling the movement of filled and sealed beverage containers from a sealing operation to a liquid level testing apparatus so that the desired elapsed time for movement of each filled and sealed container therebetween may be set to a desired period of time and maintained substantially constant at the desired period of time comprising:

container sealing apparatus mounted at a fixed location;

moving endless conveyor means mounted at a location near said container sealing apparatus for receiving, supporting and conveying filled and sealed containers away from said container sealing apparatus, each of said containers having substantially the same maximum diameter;

rotatable star wheel means for transferring filled and sealed containers from said container sealing apparatus to said moving endless conveyor means;

drive means for rotating said rotatable star wheel means;

said moving endless conveyor means having a width slightly greater than twice the diameter of each container;

said moving endless conveyor means having a first half width portion and a second half width portion, each of said first and second half width portions moving at substantially the same linear velocity;

said rotating star wheel means transferring filled and sealed containers onto said moving endless conveyor means so that all of said transferred filled and sealed containers are located on said first half width portion;

container pushing means for contacting every other filled and sealed container on said first half width portion and pushing said every other filled and sealed container from said first half portion to said second half width portion of said moving endless conveyor means;

first and a second moving fill test conveyor means, each of said first and second moving fill test conveyor means moving at substantially the same linear velocity;

container transfer means for transferring said filled and sealed containers on said first half width portion to said first moving fill test conveyor means and for transferring said filled and sealed containers on said second half width portion to said second moving fill test conveyor means;

said first and second half width portions cooperating with said container transfer means so that each container transferred by said star wheel means to said endless moving conveyor means and moving with said first half width portion to said container transfer means is transferred onto said first moving fill test conveyor means by said container transfer means in a period of time which is substantially the same as the period of time that each container transferred onto said endless moving conveyor and moving with said second half portion is transferred onto said second moving fill test conveyor means by said container transfer means;

a first and a second liquid level testing apparatus;

said first moving fill test conveyor means feeding said filled and sealed containers thereon into said first liquid level testing apparatus and said second moving fill test conveyor means feeding said filled and sealed containers thereon into said second liquid level test apparatus; and said first and second moving fill test conveyor means cooperating with said container transfer means so that each container transferred to said first moving fill test conveyor means by said container transfer means moves with said first moving fill test conveyor means and passes through said first liquid level testing apparatus in a period of time which is substantially the same as the period of time that each container transferred onto said second moving fill test conveyor means by said container transfer means moves with said second moving fill test conveyor means and passes through said second liquid level testing apparatus.

2. A system as in claim 1 wherein said container pushing means comprises:
   a moving endless chain means moving in a fixed path;
   a plurality of spaced apart container pusher means mounted on said endless chain means; and
   a portion of said fixed path extending in a diagonal direction across said moving endless conveyor means.

3. A system as in claim 2 wherein said container pushing means comprises:
   an elongated element having one end portion fixedly attached to said endless chain means; and
   the other end portion having a surface for contracting said every other filled and sealed container.

4. A system as in claim 3 and further comprising:
   rotatable driving means for moving said endless chain means in said fixed path;
   a sprocket attached to said rotatable driving means for rotating said rotatable driving means;
   a sprocket attached to said rotatable star wheel means for rotation therewith; and
   a driving chain extending between and operatively connected to said sprocket attached to said rotatable star wheel means and said sprocket attached to said rotatable driving means so that rotation of said rotatable star wheel means rotates said rotatable driving means to move said endless chain means.

5. A system as in claim 4 and further comprising:
   rotatable endless conveyor driving means for moving said endless conveyor means; and
   driving means driven by said sprocket attached to said rotatable driving means for rotating said rotatable conveyor driving means.

6. A system as in claim 5 wherein:
   said rotatable conveyor driving means moving said endless conveyor means at a linear velocity substantially equal to the peripheral velocity of said rotatable star wheel means.

7. A system as in claim 6 wherein:
   said rotatable driving means moving said endless chain means at a linear velocity substantially the same as said linear velocity of said endless conveyor means.

8. A system as in claim 7 and further comprising:
   driving means for moving each of said first and second fill test conveyor means at a linear velocity substantially less than said linear velocity of said endless conveyor means.

9. A system as in claim 3 and further comprising:
   a plurality of spaced apart container pocket means fixedly mounted on said endless conveyor means;
   the space between said container pocket means being slightly greater than said diameter of each of said containers with said every other container being located in a space between said container pocket means; and
   said container pocket means being located so as to position filled and sealed containers deposited therein on said first half width portion of said endless conveyor means.

10. A method for controlling the movement of filled and sealed beverage containers from a sealing operation to a liquid level testing apparatus so that the elapsed time for movement of each filled and sealed container therebetween may be set to a desired period of time and maintained substantially constant at the desired period of time comprising:
    mounting a container sealing apparatus at a fixed location;
    mounting moving endless conveyor means having first and second half width portions at a location near said container sealing apparatus for receiving, supporting and conveying filled and sealed containers away from said container sealing apparatus, each of said containers having substantially the same maximum diameter;
    transferring filled and sealed containers from said container sealing apparatus to said first half width portion of said moving endless conveyor means using a rotating star wheel means;
    moving said first and second half width portions at substantially the same linear velocity;
    contacting every other filled and sealed container on said first half width portion with moving pusher means and pushing said every other filled and sealed container from said first half width portion to said second half width portion;
    mounting a first and a second moving fill test conveyor means at fixed locations;
    moving said first and second fill test conveyor means at substantially the same linear velocity;
    transferring said filled and sealed containers on said first half width portion to said first moving fill test conveyor means and transferring said filled and sealed containers on said second half width portion to said second moving fill test conveyor means;
    controlling said transferring of said containers so that each container transferred by said star wheel means to said endless moving conveyor means and moving with said first half width portion is transferred onto said first moving fill test conveyor means in a period of time which is substantially the same as the period of time that each container transferred onto said endless moving conveyor and moving with said second half portion is transferred onto said second moving fill test conveyor means;
    mounting a first and second liquid level testing apparatus at fixed locations;
    feeding said filled and sealed containers on said first moving fill test conveyor means to said first liquid level testing apparatus and feeding said filled and sealed containers on said second moving fill test conveyor means to said second liquid level testing apparatus; and
    controlling the movement of said containers on said first and second moving fill test conveyor means so that each container transferred to said first moving fill test conveyor means moves with said first moving fill test conveyor means and passes through said first liquid level testing apparatus in a period of time which is substantially the same as the period of time that each container transferred onto said second moving fill test conveyor means moves with said second moving fill test conveyor means and passes through said second liquid level testing apparatus.

11. A method as in claim 10 and further comprising:
    moving said first and second moving fill test conveyor means at a linear velocity substantially less than the linear velocity of said moving endless conveyor means.

12. A method as in claim 10 and further comprising:
changing said period of time by changing the velocity of said first and second moving fill test conveyor means.

13. A method as in claim 10 and further comprising:
moving said pusher means diagonally across said moving endless conveyor means.

14. A method as in claim 13 and further comprising:
moving said pusher means and said moving endless conveyor means at substantially the same linear velocity.

15. A system for controlling the movement of filled and sealed beverage containers from a sealing operation to a liquid level testing apparatus so that the desired elapsed time for movement of each filled and sealed container therebetween may be set to a desired period of time and maintained substantially constant at the desired period of time comprising:
container sealing apparatus mounted at a fixed location;
a single moving endless conveyor mounted at a location near said container sealing apparatus for receiving, supporting and conveying filled and sealed containers away from said container sealing apparatus, each of said containers having substantially the same maximum diameter;
rotatable star wheel means for transferring filled and sealed containers from said container sealing apparatus to said single moving endless conveyor means;
drive means for rotating said rotatable star wheel means;
said single moving endless conveyor having a width slightly greater than twice the diameter of each container;
said single moving endless conveyor having a first half width portion and a second half width portion;
said rotating star wheel means transferring filled and sealed containers onto said single moving endless conveyor so that all of said transferred filled and sealed containers are located on said first half width portion; container pushing means for contacting every other filled and sealed container on said first half width portion and pushing said every other filled and sealed container from said first half width portion to said second half width portion of said single moving endless conveyor means with the remaining containers staying on said first half width portion;
first and a second moving fill test conveyor means, each of said first and second moving fill test conveyor means moving at substantially the same linear velocity;
container transfer means for transferring said filled and sealed containers on said first half width portion to said first moving fill test conveyor means and for transferring said filled and sealed containers on said second half width portion to said second moving fill test conveyor means;
said first and second half width portions cooperating with said container transfer means so that each container transferred by said star wheel means to said single moving endless conveyor means and moving with said first half width portion to said container transfer means is transferred onto said first moving fill test conveyor means by said container transfer means in a period of time which is substantially the same as the period of time that each container transferred onto said single moving endless conveyor and moving with said second half portion is transferred onto said second moving fill test conveyor means by said container transfer means;
a first and a second level testing apparatus;
said first moving fill test conveyor means feeding said filled and sealed containers thereon into said first liquid level testing apparatus and said second moving fill test conveyor means feeding said filled and sealed containers thereon into said second liquid level testing apparatus; and
said first and second moving fill test conveyor means cooperating with said container transfer means so that each container transferred to said first moving fill test conveyor means by said container transfer means moves with said first moving fill test conveyor means and passes through said first liquid level testing apparatus in a period of time which is substantially the same as the period of time that each container transferred onto said second moving fill test conveyor means by said container transfer means moves with said second moving fill test conveyor means and passes through said second liquid level testing apparatus.

16. A system as in claim 15 wherein said can pushing means comprises:
a moving endless chain means moving in a fixed path;
a plurality of spaced apart container pusher means mounted on said endless chain means; and
a portion of said fixed path extending in a diagonal direction across said single moving endless conveyor.

17. A system as in claim 16 wherein said can pusher means comprises:
an elongated element having one end portion fixedly attached to said endless chain means; and
the other end portion of said elongated element having a surface for contacting said every other filled and sealed container.

18. A system as in claim 17 and further comprising:
rotatable driving means for moving said endless chain means in said fixed path;
a sprocket attached to said rotatable driving means for rotation with said rotatable driving means;
a sprocket attached to said rotatable star wheel means for rotation therewith; and
a driving chain extending between said operatively connected to said sprocket attached to said rotatable star wheel means and said sprocket attached to said rotatable driving means so that rotation of said rotatable star wheel means rotates said rotatable driving means to move said endless chain means.

19. A system as in claim 18 and further comprising:
rotatable endless conveyor driving means for moving said single moving endless conveyor; and
driving means driven by said sprocket attached to said rotatable driving means for rotating said rotatable endless conveyor driving means.

20. A system as in claim 19 wherein:
said rotatable endless conveyor driving means moving said single moving endless conveyor at a linear velocity substantially equal to the peripheral velocity of said rotatable star wheel means.

* * * * *